United States Patent [19]

Boudrot et al.

[11] 3,955,534
[45] May 11, 1976

[54] LABORATORY ANIMAL ACTIVITY GAME

[75] Inventors: Robert J. Boudrot, Falmouth; Harry G. Olsen, Woburn; Frederick Halbich, Burlington, all of Mass.

[73] Assignee: GTE Laboratories Incorporated, Waltham, Mass.

[22] Filed: Mar. 7, 1975

[21] Appl. No.: 556,511

[52] U.S. Cl. .................................. 119/15; 119/29
[51] Int. Cl.² ........................................ A01K 29/00
[58] Field of Search ...................... 119/29, 15, 17, 1

[56] References Cited
UNITED STATES PATENTS

| | | | |
|---|---|---|---|
| 3,100,473 | 8/1963 | Kissel | 119/1 |
| 3,494,329 | 2/1970 | Frieberger et al. | 119/1 |
| 3,540,413 | 11/1970 | Castaigne | 119/29 |

Primary Examiner—Hugh R. Chamblee
Assistant Examiner—Peter K. Skiff
Attorney, Agent, or Firm—Irving M. Kriegsman; Leslie J. Hart

[57] ABSTRACT

The motion of a caged laboratory animal is recorded by providing in the floor of the cage a platform which tilts slightly into one of four quadrants in response to the location of the animal within the cage. The tilting of the platform activates a switch for each quadrant, the output of the switches being recorded as a function of time. The platform has a fulcrum cone located at the center of gravity and is mounted over a platform support. The platform support includes a central pivot point over which the fulcrum cone of the platform is mounted and four upstanding posts which are located at the midpoints of the sides of the platform support. The elevation of the posts at the sides is slightly lower than the lower surface of the platform when it is balanced about the central pivot point. The switches are located at the corners of the platform support. When the weight of the animal is directed through one quadrant of the platform, the platform tilts and comes to rest in a plane defined by the central pivot and the two adjacent posts in that quadrant. The switch for that quadrant is also in the plane and is activated by the lower surface of the platform. The outputs of all four switches may be recorded for any desired length of time.

5 Claims, 10 Drawing Figures

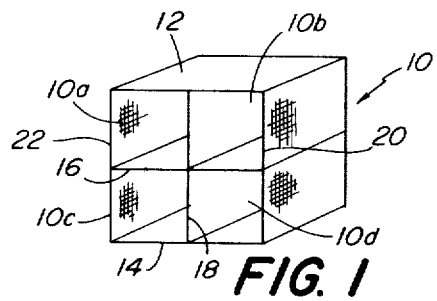
FIG. 1
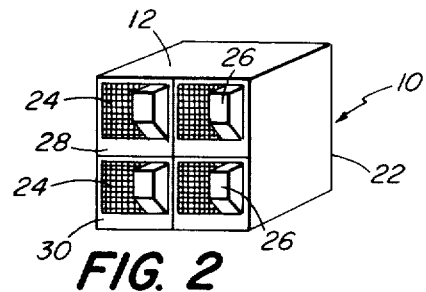
FIG. 2
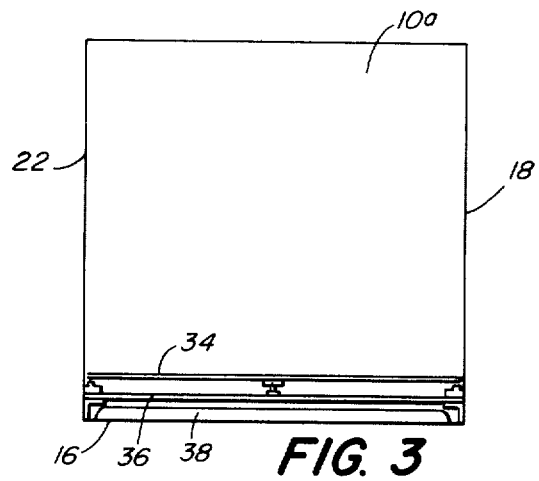
FIG. 3
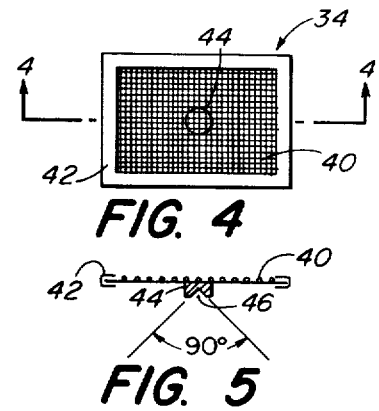
FIG. 4
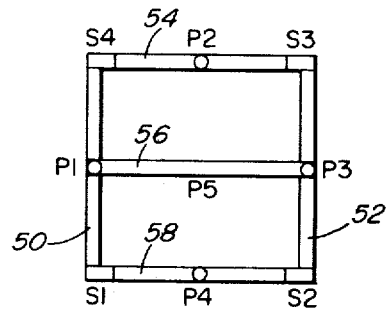
FIG. 6
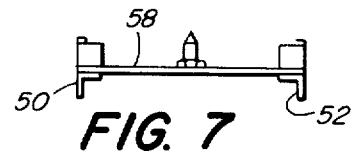
FIG. 5
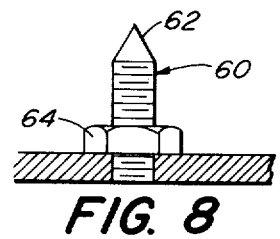
FIG. 7
FIG. 8
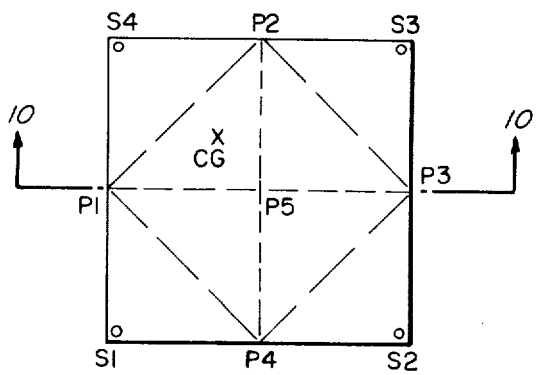
FIG. 9
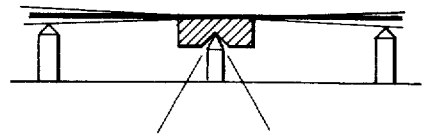
FIG. 10

LABORATORY ANIMAL ACTIVITY GAME

BACKGROUND OF THE INVENTION

The present invention relates to laboratory animal cages and, more specifically, to cages in which the movement of the animal in the cage may be recorded for an indefinite length of time.

Laboratory animals, such as rats, are frequently subjected to various stimuli to determine what effect such stimuli has on the animals and, consequently, to estimate what effect such stimuli might have on human beings. The types of stimuli vary greatly and include, amongst many others, new drugs and various environments. The effect of any particular stimulus may be monitored in several ways. One technique for determining the effect of a stimulus on a laboratory animal is observing the movement of the animal within a cage. The stimulus may alter one or more of the characteristics of the animal, such as its preferred location within the cage, frequency of movement or speed of movement. Thus, it is desirable to record the motion of the animal within the cage as a function of time. During working hours, attendants in the laboratory could visually observe the activity of the animals. However, it is important to make a permanent record of the activity continuously over long time durations, such as a week or even longer. Several possible recording devices are known, such as a movie camera. But, to the knowledge of the inventors none is known which can record the movement of laboratory animals in an economical, efficient manner.

SUMMARY OF THE INVENTION

According to the present invention, an apparatus is described in which the movement of an animal in a defined, enclosed area may be detected and recorded for indefinitely long time durations. The apparatus includes a cage and a platform which is horizontally balanced about its center of gravity. Whenever the net forces acting on the platform are not directed through the center of gravity, such as when a laboratory animal is positioned on the platform and not precisely at the center of the platform, the platform tilts. A plurality of upstanding posts which are affixed below the platform limit the tilting action so that the animal is not unduly disturbed by the tilting action. The posts and a central pivot point about which the platform is balanced define a plurality of planes into which the platform may be aligned. Each plane corresponds to a region on the platform where the net force on the platform is directed. An appropriate indicating device is positioned in each plane to provide a signal indicative of the region of the platform in which the animal has moved.

In a preferred form of the invention, the platform is a parallelogram and a support platform, to which the posts, central pivot points and indicating devices are affixed, is located below the platform. Four upstanding posts are located at the midpoints of the sides of the platform. Any two adjacent posts and the central pivot point define a plane into which the platform may be aligned. Four planes are defined, and each corresponds to a quadrant of the platform. A switch is disposed in each plane below each corner of the platform to provide an output signal whenever the platform makes contact with the switch. The output signal of each switch may be recorded by an appropriate device, such as a recorder, which provides a permanent record of the movement of the animal within four quadrants of the cage as a function of time. Thus, valuable data is obtained relating to the amount of time the animal spends in any particular part of the cage, the speed at which the animal moves within the cage and how frequently the animal moves. The present apparatus is not only economical to construct but also the results of the apparatus may be interpreted in a straightforward, uncomplicated manner. For example, the results may be a time plot of each of the switches thereby indicating whether or not the animal was in a given quadrant at any particular time.

BRIEF DESCRIPTION OF THE DRAWINGS

In the drawings:

FIG. 1 is a front perspective view of an illustrative animal cage which may incorporate the features of the present invention;

FIG. 2 is a rear perspective view of the animal cage shown in FIG. 1;

FIG. 3 is a front elevational view of a cage and platform assembly according to the present invention;

FIG. 4 is a plan view of a platform in accordance with the present invention;

FIG. 5 is a sectional view of the platform taken along line 4—4 of FIG. 3;

FIG. 6 is a plan view of a platform support in accordance with the present invention;

FIG. 7 is a front view of the support platform shown in FIG. 5;

FIG. 8 is a diagram of the upstanding posts in accordance with the present invention;

FIG. 9 is a diagram illustrating the location and operation of the switches, the upstanding posts and the central pivot point; and FIG. 10 is a diagram illustrating the extent of the tilting action of the platform.

DESCRIPTION OF THE PREFERRED EMBODIMENTS

Referring now to the drawings, FIG. 1 illustrates a multiple animal cage assembly 10 having a plurality of individual cages 10a, 10b, 10c and 10d. It is to be understood, that the principles of the present invention may be utilized for any purpose for which it is desirable to track the movement of animal in a defined enclosed area for extended time durations. Typically, each cage has a 9½ inch square floor and a ceiling which is 9 inches above the floor. A top 12, a floor 14, a middle floor 16 and a dividing portion 18 are preferably made of a solid, non-transparent material, such as stainless steel sheet. Typically, the sheet is 0.029 inches thick. This type of construction provides visual isolation beweeen four animals in the cage assembly 10. The exterior sides 20 and 22 and the front (not shown) are made of transparent material, such as stainless steel wire mesh (½ × ½ × 16 gage welded). The rear of the cage assembly 10, which is illustrated in FIG. 2, has doors 24 and feeders 26. These doors 24 cover only 7 inches of the total 9 inch height. Clearance surfaces 28 and 30 allow clearance for the support platform to be described hereinafter. The doors 24 are made of stainless steel wire mesh (½ × ½ × 16 gage welded) with ½ inch stainless steel sheet. (0.029 inches thick) extending around the sides.

FIG. 3 illustrates the assembly of the major components comprising the present invention. This figure shows, for example, the cage 10a which is also shown in FIG. 1. For simplicity, the rear door 24 and feeder 26 are not shown. The animal activity cage of the present invention includes the cage 10a, a platform 34, a platform support 36 and a dropping tray 38. The platform 34, shown in plan view in FIG. 4, has a wire mesh 40 which preferably is 9 inches square and made of stainless steel ½ × ½ × 16 gage welded, and a frame 42 which is stainless steel sheet metal. The mesh 40 permits the droppings from the animal to fall through the platform and onto the dropping tray 38. The frame 42 protects the various elements which are affixed to the platform support from being contaminated by the droppings. In accordance with the present invention, a fulcrum cone 44 is fastened to the underside of the mesh 40. As shown in FIG. 5, the cone 44 has a 90° counter sink 46 formed in the lower surface of the fulcrum cone 44. The cone is located at the center of gravity of the platform when the platform is in horizontal plane.

FIGS. 6 and 7 illustrate in more detail the structure of the platform support 36 which is located below the platform in FIG. 3. The platform support 36 has a pair of angle members 50 and 52 which are fastened to support bars 54, 56 and 58. The angle members permit the dropping tray to be located beneath the raised support bars.

As shown in FIG. 6, a group of four upstanding posts, designated P1 to P4, a central pivot point P5 and a group of four switches S1 to S4 are affixed to the support platform 36. Pivot point P5 is located at the center while posts P1 to P4 are located at the midpoint of the sides of the support platform 36. The switches S1 to S4 are affixed to the corners of the support platform 36. As shown in FIG. 8, each of the posts P1 to P4 and the pivot point P5 has a threaded rod 60 having 60° tapered points 62 machined into the upper end. The lower end of the rod 60 is located in an opening in the support rod, and a nut 64 holds the rod in place. The switches S1 to S4 are of a conventional type in which an electrical signal is generated in response to a closing of a switch contact, designated generally by the numeral 65. Any suitable sensor may be used in lieu of the switches.

In operation, the platform 34 is placed on the platform support 36 by locating the end of the pivot point P5 in the counter sink 46 in the fulcrum cone 44. With no weight imbalance, the platform 34 remains horizontal with the central fulcrum being the only place in which the platform 34 and support 36 are in contact. Stated differently, the net force on the platform is vertically directed through the center of gravity. The verticle elevations of the upstanding posts are intentionally made somewhat lower than the elevation of the lower surface of the platform 34. The difference in elevation establishes the tilt angle, shown in FIG. 10, which is required to activate the switches 34 or sensors. The tilt angle should remain small so that the tilting action of the platform does not disturb the animal; on the other hand, the displacement of the platform must be large enough to activate the indicating devices. It has been found that by locating the indicating devices a greater distance from the central pivot point than the distance between an adjacent post and the central pivot point adequate platform displacement with a minimum tilt angle is achieved. In the embodiment described herein, the platform corner displaces ⅛ inch and the displacement of the platform at a post is 1/16 inch. Three points establish a plane; therefore, the platform 34 may rest on three points at one time and trip one switch. The platform must align itself onto one of four possible planes. The contact 65 of each switch is also located in one of the planes as defined in the following table.

| Plane | Switch |
| --- | --- |
| P1 P5 P4 | S1 |
| P1 P5 P2 | S4 |
| P2 P5 P3 | S3 |
| P3 P5 P4 | S2 |

Thus, any two adjacent posts and the pivot point establish a plane. The lines, shown in FIG. 10, which intersect the pivot point and two posts on opposite sides of the pivot point define the four quadrants. When the center of gravity of the animal is in any quadrant, the platform tilts downwardly until the surface of the platform contacts the two posts which define the quadrant. For example, if the center of gravity of the animal is at the point X, the platform comes to rest on pivot point P5 and posts P1 and P2; at the same time switch S4 is activated because it is in the same plane as that defined by P1, P2 and P5. The switch outputs are connected to a suitable recording device (not shown) which plots the output of each switch as a function of time.

The present invention contemplates the idea of a tiltable platform which may align itself, in response to a net force on the platform directed through other than the center of gravity, into one of a plurality of defined planes. Each plane corresponds to a region on the platform through which the net force is directed. A suitable indicating device, located in each plane, generates a signal indicating the presence of the animal in the corresponding region of the platform.

The embodiments of the present invention are merely exemplary and those skilled in the art will be able to make numerous variations and modifications of them without departing from the spirit of the invention. All such modifications and variations are intended to be included within the scope of the present invention as defined by the appended claims.

We claim:

1. An apparatus for recording the movement of an animal housed within a defined, enclosed area including:
   a. a cage having a size adequate to house the animal for extended time intervals and to allow the animal to move in any direction in a horizontal plane,
   b. a platform in the shape of a parallelogram located generally at the bottom of the cage and being positioned in a horizontal plane, the platform having a surface area substantially conforming to the horizontal surface area of the cage,
   c. means below the center of gravity of the platform for balancing the platform in the horizontal plane in response to a net force acting on the platform which is directed through the center of gravity of the platform,
   d. means for defining a predetermined, fixed plurality of non-horizontal planes into which the platform may be aligned, the planes corresponding to a plurality of defined regions on the platform through which the force is directed, the platform adapted to align itself into one of the planes in response to a net force on the platform directed other than through the center of gravity of the platform, the multiple plane defining means including a horizontal support platform located below the platform, the central pivot point being affixed to the support platform, and four upstanding posts affixed to the support platform below the midpoints of the four side edges of the platform, the upper ends of the posts being of lower elevation than the lower surface of the platform, any adjacent pair of the posts and the central pivot point defining a quadrant and a plane into which the platform may be aligned in response to a weight imbalance directed through the corresponding quadrant, and e. means for separately indicating the presence of the platform in each of the non-horizontal planes.

2. The apparatus according to claim 1 wherein the balancing means includes a vertical pivot point located centrally at the floor of the cage and a fulcrum cone formed with a counter sink which is affixed to the underside of the platform at its center of gravity, the central pivot point being located in the counter sink so that the platform is balanced about the central pivot point.

3. The apparatus according to claim 2 wherein the indicating means includes four switch means for providing an electrical output signal in response to activation of the switch, each switch being affixed to the support platform below one of the corners of the platform and being positioned in one of the planes so that an electrical output signal is created whenever a weight imbalance is directed through each of the four quadrants.

4. The apparatus according to claim 3 wherein the platform is made of stainless steel and includes a central mesh region and a peripheral sheet of a width sufficient to overlay the switches and posts.

5. The apparatus according to claim 1 wherein the distance between the indicating means and the balancing means is substantially greater than the distance between the plane defining means and the balancing means.

* * * * *

PO-1050
(5/69)

UNITED STATES PATENT OFFICE
CERTIFICATE OF CORRECTION

Patent No. 3,955,534            Dated May 11, 1976

Inventor(s) Robert J. Boudrot/Harry G. Olsen/Fredrick Halbich

It is certified that error appears in the above-identified patent and that said Letters Patent are hereby corrected as shown below:

In the Title of the Invention, delete "GAME" and insert --CAGE--;
Column 2, line 54, delete "betweeen" and insert --between--;
Column 3, lines 49 and 50, delete "verticle" and insert --vertical--;

Signed and Sealed this

Twenty-seventh Day of July 1976

[SEAL]

Attest:

RUTH C. MASON
*Attesting Officer*

C. MARSHALL DANN
*Commissioner of Patents and Trademarks*